Patented Oct. 2, 1934

1,975,386

UNITED STATES PATENT OFFICE 1,975,386

PROCESS OF PREPARING 1.4-DIAMINO-ANTHRAQUINONE-2.3-DISULPHONIC ACID

Fritz Baumann, Leverkusen-I. G. Werk, Germany, assignor to General Aniline Works, Inc., New York, N. Y., a corporation of Delaware No Drawing. Application March 23, 1933, Serial No. 662,387. In Germany March 26, 1932

5 Claims. (Cl. 260—60)

The present invention relates to a process of preparing 1.4-diaminoanthraquinone-2.3-disulphonic acid.

In accordance with the invention 1.4-diaminoanthraquinone-2.3-disulphonic acid can be prepared in a very convenient manner, in a good yield and in a good purity by reacting upon the boron-acetic acid ester or the boric acid ester of an 1.4-diamino-2.3-dihalogen anthraquinone with a water soluble neutral sulphite, such as potassium, sodium, ammonium sulphite, piperidine sulphite etc.

The reaction is advantageously performed in an aqueous medium with or without the addition of an organic solvent being inert to the starting materials and being miscible with water, such as phenol, alcohols etc. The reaction takes place at normal temperature but is substantially accelerated by heating of the reaction mixture. Preferred temperature ranges are those between about 80 and about 100° C. Higher temperatures are likewise operable but unnecessary and inconvenient since they involve the application of superatmospheric pressure.

The boron acetic acid esters of 1.4-diamino-2.3-dihalogen anthraquinones may be prepared by reacting upon 1.4-diamino-2.3-dihalogenanthraquinones with boron acetic acid anhydride (see Dimroth, Annalen der Chemie, vol. 446, page 112). The boric acid esters of 1.4-diamino-2.3-dihalogenanthraquinones can be obtained by reacting upon 1.4-diamino-2.3-dihalogenanthraquinones with boric acid in concentrated sulphuric acid, phenol or other acid medium. In this case it is possible to combine the formation of the boric acid ester and the transformation of the same into 1.4-diaminoanthraquinone-2.3-disulphonic acid into one step of working (see Example 3).

There is known a method to replace the halogen atoms of beta-halogenanthraquinones by the sulphonic acid group by reacting upon these compounds with sulphurous acid or salts of sulphurous acid (see German Patent No. 288,878). When subjecting an 1,4-diamino-2,3-dihalogenanthraquinone to the process of that patent, 1,4-diaminoanthraquinone-2,3-disulphonic acid is only obtained in a bad yield and in an impure form. When working according to Example 2 of said patent, that is in the presence of phenol, 1,4-diamino-2-phenoxyanthraquinone-3-sulphonic acid is obtained but not 1,4-diaminoanthraquinone-2,3-disulphonic acid. From this it is clearly evident that the boron acetic acid esters and the boric acid esters of 1.4-diamino-2,3-dihalogenanthraquinones are not to be considered equivalents to 1,4-diamino-2,3-dihalogenanthraquinones themselves, since the former compounds yield the 1,4-diaminoanthraquinone-2,3-disulphonic acid in a good yield and in a good purity when treated with sulphites as disclosed above.

The following examples illustrate the invention, without, however, restricting it thereto, the parts being by weight:—

Example 1

After heating to boiling a solution of 80 parts of boric acid in the tenfold quantity of acetic acid anhydride, 120 parts of 1,4-diamino-2,3-dichloroanthraquinone are added and the mixture is heated until the starting material cannot be detected anymore. During the heating the boron-acetic acid ester separates in beautiful blue needles, which dissolve in sulphuric acid with a red coloration and with a strong fluorescence. After cooling the compound is sucked off, washed well and after removing the acetic acid anyhdride it is introduced, while still wet, into a solution of 4000 parts of water and 360 parts of crystallized sodium sulphite at a temperature of about 90–95° C. The ester immediately dissolves with an olive coloration and the reaction is finished within some minutes. At a temperature of 50–60° C. the boron-acetic acid ester is decomposed at the addition of caustic soda solution, and the anthraquinone-1,4-diamino-2,3-disulphonic acid salted out with sodium chloride as soon as the olive color of the solution has changed to a clear blue. The dyestuff, obtainable in a very pure form and crystallizing in blue needles, is isolated in the usual manner, and it dyes wool in fast clear blue shades. It is soluble in water with a blue coloration; the weakly yellow colored sulphuric acid solution changes to green at the addition of formaldehyde and to blue at the addition of boric acid.

Example 2

16 parts of boric acid are dissolved while gently heating in such a quantity of fuming sulphuric acid that after the dissolving of the boric acid monohydric sulphuric acid has formed. Thereupon 30.7 parts of 1,4-diamino-2,3-dichloroanthraquinone are introduced at a temperature of about 50–60° C. and the violet solution is stirred until the formation of the boric acid ester is complete. After cooling the melting is carefully poured on ice, sucked off and neutralized. The neutralized paste is then introduced into a solution of 1500 parts of water and 120 parts of crystallized sodium sulphite at a temperature of 90° C. The conversion and further working up of the reaction product is performed as described in Example 1.

Example 3

5 parts of 1.4-diamino-2.3-dichloroanthraquinone, 30 parts of phenol and 2.5 parts of boric acid are heated to a temperature of 150–160° C. until the boric acid ester, soluble in pyridine with a blue coloration, has formed. After cooling the mixture to 100° C. 15 parts of crystallized sodium sulphite dissolved in 100 parts of water are added and the whole is stirred for some time at a temperature of about 110–120° C. As soon as the reaction is finished the phenol is separated by steam distillation and after filtering the solution is salted out with sodium chloride.

Instead of the 1,4-diamino-2,3-dichloroanthraquinone specified above the corresponding dibromo derivative may be applied with a similar result.

I claim:—

1. The process which comprises reacting upon a compound selected from the group consisting of boron-acetic acid esters and boric acid esters of the 1,4-diamino-2,3-dihalogenanthraquinones with a neutral water soluble sulphite in an aqueous medium.

2. The process which comprises reacting at elevated temperature upon a compound selected from the group consisting of boron-acetic acid esters and boric acid esters of the 1,4-diamino-2,3-dihalogenanthraquinones with a neutral water soluble sulphite in an aqueous medium.

3. The process which comprises reacting at a temperature between about 80 and about 100° C. upon a compound selected from the group consisting of boron-acetic acid esters and boric acid esters of the 1,4-diamino-2,3-dihalogenanthraquinones with a neutral water soluble sulphite in an aqueous medium.

4. The process which comprises reacting upon the boric acid ester of 1,4-diamino-2,3-dichloroanthraquinone with a compound of the group consisting of sodium- and potassium sulphite in an aqueous medium at elevated temperature.

5. The process which comprises reacting upon the boric acid ester of 1,4-diamino-2,3-dichloroanthraquinone with a compound of the group consisting of sodium- and potassium sulphite in an aqueous medium at a temperature between about 80 and about 100° C.

FRITZ BAUMANN.